(12) United States Patent
Chang et al.

(10) Patent No.: US 12,284,005 B2
(45) Date of Patent: Apr. 22, 2025

(54) RECONFIGURABLE INTELLIGENT SURFACE AND ELECTROMAGNETIC SENSING SYSTEM BASED ON RECONFIGURABLE INTELLIGENT SURFACE

(71) Applicant: NATIONAL CHUNG CHENG UNIVERSITY, Chiayi (TW)

(72) Inventors: Chia-Chan Chang, Chiayi (TW); Sheng-Fuh Chang, Chiayi County (TW); Shih-Cheng Lin, Taitung County (TW); Yuan-Chun Lin, Hsinchu County (TW); Wei-Lun Hsu, Tainan (TW)

(73) Assignee: NATIONAL CHUNG CHENG UNIVERSITY, Chiayi (TW)

( * ) Notice: Subject to any disclaimer, the term of this patent is extended or adjusted under 35 U.S.C. 154(b) by 421 days.

(21) Appl. No.: 18/051,509

(22) Filed: Oct. 31, 2022

(65) Prior Publication Data
US 2024/0047857 A1 Feb. 8, 2024

(30) Foreign Application Priority Data

Aug. 8, 2022 (TW) .................................. 111129778

(51) Int. Cl.
*H04B 7/04* (2017.01)
(52) U.S. Cl.
CPC ................................ *H04B 7/04013* (2023.05)
(58) Field of Classification Search
CPC .................................................. H04B 7/04013
See application file for complete search history.

(56) References Cited

U.S. PATENT DOCUMENTS

| 2019/0260120 | A1 | 8/2019 | Khushrushahi et al. | |
| 2021/0384958 | A1* | 12/2021 | Denis | H04B 7/145 |
| 2022/0059943 | A1* | 2/2022 | Saab | H04B 7/0617 |
| 2023/0087862 | A1* | 3/2023 | Dai | H04B 7/0695 |
| | | | | 370/315 |

FOREIGN PATENT DOCUMENTS

WO 2021/239259 A1 12/2021

* cited by examiner

*Primary Examiner* — Hsinchun Liao
(74) *Attorney, Agent, or Firm* — CKC & Partners Co., LLC (57) ABSTRACT

A reconfigurable intelligent surface includes a radiant layer, a sensing feeding circuit layer, a processing layer and a controlling circuit layer. The radiant layer includes at least two antennas and a plurality of reflecting units. Each of the at least two antennas is configured for sensing a polarization, a frequency or a direction angle of an incident electromagnetic wave. The reflecting units are arranged to form a reflecting surface. The sensing feeding circuit layer is signally connected to the antennas. The processing layer is signally connected to the sensing feeding circuit layer, and the processing layer is configured to produce a controlling signal corresponding thereto. The controlling circuit layer is signally connected to the radiant layer and the processing layer, wherein the controlling circuit layer receives the controlling signal and controls the reflecting units according to the controlling signal to adjust and form a reflecting electromagnetic wave.

10 Claims, 10 Drawing Sheets

RECONFIGURABLE INTELLIGENT SURFACE AND ELECTROMAGNETIC SENSING SYSTEM BASED ON RECONFIGURABLE INTELLIGENT SURFACE

RELATED APPLICATIONS

This application claims priority to Taiwan Application Serial Number 111129778, filed Aug. 8, 2022, which is herein incorporated by reference.

BACKGROUND

Technical Field

The present disclosure relates to an intelligent surface and a system thereof. More particularly, the present disclosure relates to a reconfigurable intelligent surface and an electromagnetic sensing system based on a reconfigurable intelligent surface.

Description of Related Art

With the development of wireless communication technology, electronic devices such as phones, tablets, etc., need to receive communication signals to perform various functions well, so the requirement whether the electronic devices can receive the communication signals stably is increased gradually. Recently, the communication signals are emitted from a base station in the form of electromagnetic waves; however, if there is a barrier between the base station and the electronic device, the electronic device cannot receive the communication signals emitted from the base station stably so that the signals are unstable, and even lost. In results, the practitioners develop a reconfigurable intelligent surface (RIS) disposed between the base station and the electronic device, the reconfigurable intelligent surface can adjust a direction, a frequency and a polarization of a reflecting electromagnetic wave to transmit the communication signals which bypass the barrier to the electronic device by the reflecting electromagnetic wave. To transmit the reflecting electromagnetic wave to the electronic device precisely, the reconfigurable intelligent surface obtains channel state information (CSI) of the communication signal by method of channel estimation, and then adjusts and reflects the reflecting electromagnetic wave according to CSI. However, in the conventional electromagnetic sensing technology, CSI is hard to be obtained precisely, or need to be obtained by lots of calculation. Thus, a method of obtaining more electromagnetic information in environment to calculate effectively and obtain the more precise CSI is still missing.

Accordingly, a reconfigurable intelligent surface which can improve the accuracy of transmitting the reflecting electromagnetic wave to the electronic device and boost the speed of the whole sensing system is still a pursued target of practitioners.

SUMMARY

According to one aspect of the present disclosure, a reconfigurable intelligent surface includes a radiant layer, a sensing feeding circuit layer, a processing layer and a controlling circuit layer. The radiant layer includes at least two antennas and a plurality of reflecting units. Each of the at least two antennas is configured for sensing a polarization, a frequency or a direction angle of an incident electromagnetic wave. The reflecting units are arranged to form a reflecting surface. The sensing feeding circuit layer is signally connected to the at least two antennas to produce a sensing signal. The processing layer is signally connected to the sensing feeding circuit layer and receives the sensing signal, the processing layer is configured for interpreting an electromagnetic wave polarization type and the tilt angle of the polarization of the incident electromagnetic wave, a frequency value of the frequency of the incident electromagnetic wave, and a direction angle value of the direction angle of the incident electromagnetic wave to produce a controlling signal corresponding thereto. The controlling circuit layer is signally connected to the radiant layer and the processing layer, wherein the controlling circuit layer receives the controlling signal and controls the reflecting units according to the controlling signal to adjust and form a reflecting electromagnetic wave.

According to one aspect of the present disclosure, a reconfigurable intelligent surface includes a radiant layer, a plurality of switching units, a sensing feeding circuit layer, a processing layer and a controlling circuit layer. The radiant layer includes a plurality of sensing-and-reflecting units arranged to form a reflecting surface. The switching units are configured to switch each of the sensing-and-reflecting units to a sensing mode or a reflecting mode. When each of the sensing-and-reflecting units is operated in the sensing mode, each of the sensing-and-reflecting units is configured for sensing an incident electromagnetic wave; when each of the sensing-and-reflecting units is operated in the reflecting mode, each of the sensing-and-reflecting units is configured to adjust and form a reflecting electromagnetic wave according to an electromagnetic wave polarization type and a tilt angle of a polarization of the incident electromagnetic wave, a frequency value of a frequency of the incident electromagnetic wave, and a direction angle value of a direction angle of the incident electromagnetic wave. The sensing feeding circuit layer is signally connected to the sensing-and-reflecting units. When each of the sensing-and-reflecting units is operated in the sensing mode, the sensing feeding circuit layer produces a sensing signal. The processing layer is signally connected to the sensing feeding circuit layer and receives the sensing signal, the processing layer is configured for interpreting the electromagnetic wave polarization type and a tilt angle of the polarization of the incident electromagnetic wave, the frequency value of the frequency of the incident electromagnetic wave, and the direction angle value of the direction angle of the incident electromagnetic wave to produce a controlling signal corresponding thereto. The controlling circuit layer is signally connected to the radiant layer and the processing layer, wherein the controlling circuit layer receives the controlling signal and controls the switching units according to the controlling signal to switch each of the sensing-and-reflecting units to operate in the sensing mode or operate in the reflecting mode. When each of the sensing-and-reflecting units is at the reflecting mode, the sensing-and-reflecting units adjust and form the reflecting electromagnetic wave.

According to one aspect of the present disclosure, an electromagnetic sensing system based on a reconfigurable intelligent surface includes a base station, the reconfigurable intelligent surface and an electronic device. The base station is configured for emitting an incident electromagnetic wave. The reconfigurable intelligent surface is configured for sensing the incident electromagnetic wave to adjust and form a reflecting electromagnetic wave, and includes a radiant layer, a sensing feeding circuit layer, a processing layer and a controlling circuit layer. The radiant layer includes at least two antennas and a plurality of reflecting units. Each of the at least two antennas is configured for sensing a polarization, a frequency or a direction angle of the incident electromagnetic wave. The reflecting units are arranged to form a reflecting surface. The sensing feeding circuit layer is signally connected to the at least two antennas to produce a sensing signal. The processing layer is signally connected to the sensing feeding circuit layer and receives the sensing signal, the processing layer is configured for interpreting an electromagnetic wave polarization type and a tilt angle of the polarization of the incident electromagnetic wave, a frequency value of the frequency of the incident electromagnetic wave, and a direction angle value of the direction angle of the incident electromagnetic wave to produce a controlling signal corresponding thereto. The controlling circuit layer is signally connected to the radiant layer and the processing layer, wherein the controlling circuit layer receives the controlling signal and controls the reflecting units according to the controlling signal to adjust and form the reflecting electromagnetic wave. The electronic device is configured to receive the reflecting electromagnetic wave.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
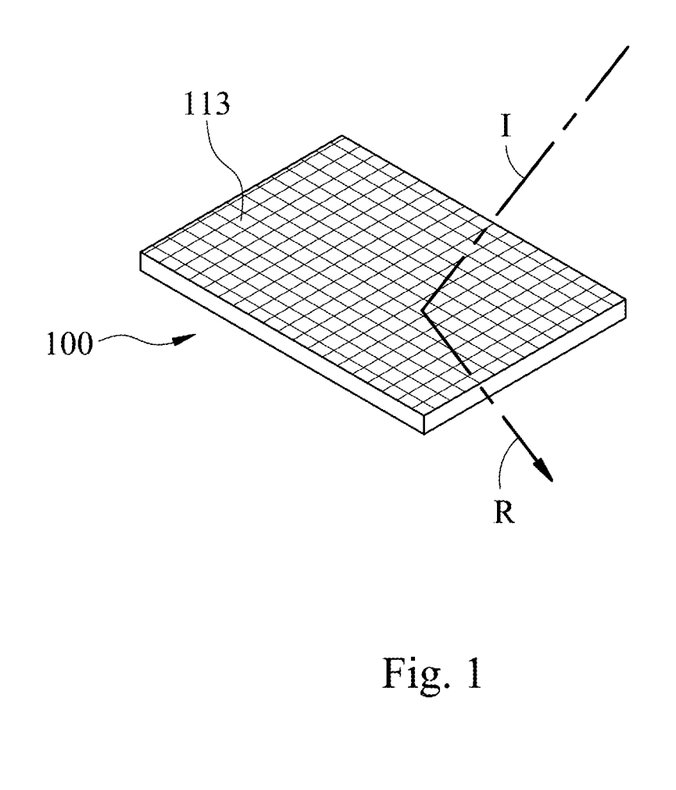
FIG. 1 shows a schematic view of a reconfigurable intelligent surface adjusting and forming a reflecting electromagnetic wave based on an incident electromagnetic wave according to the 1st embodiment of the present disclosure.
Figure 2:
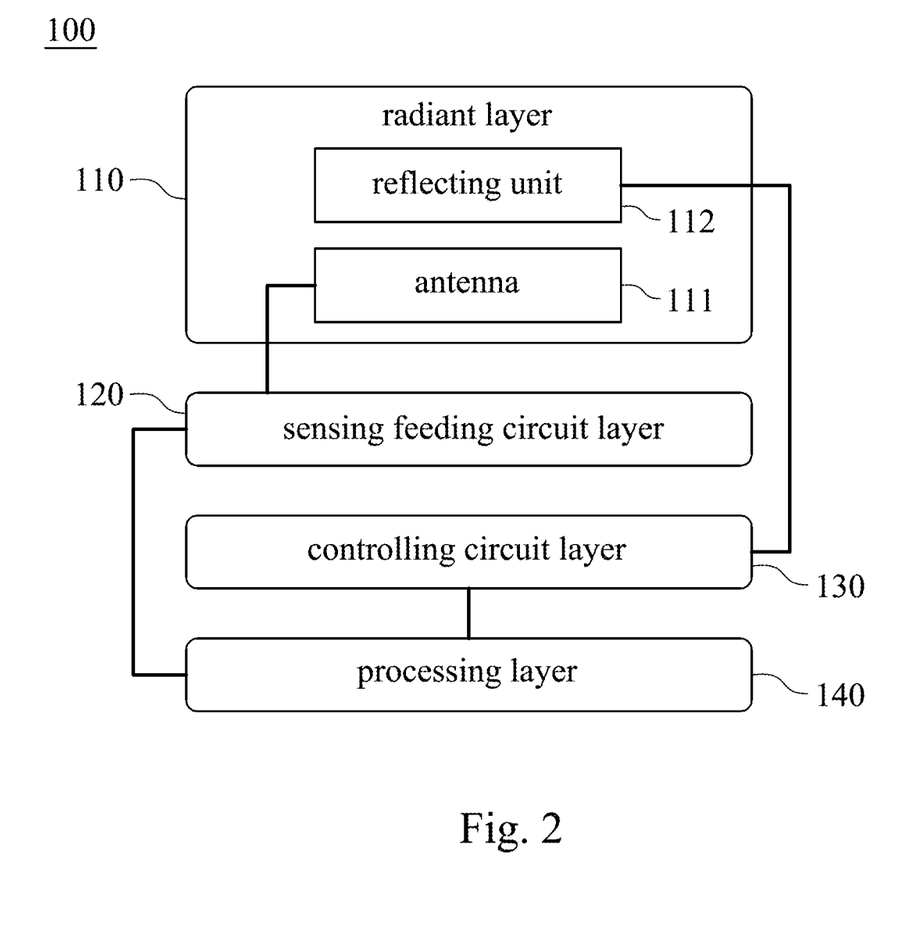
FIG. 2 shows a block diagram of the reconfigurable intelligent surface according to the 1st embodiment in FIG. 1.

FIG. 1 shows a schematic view of a reconfigurable intelligent surface 100 adjusting and forming a reflecting electromagnetic wave R based on an incident electromagnetic wave I according to the 1st embodiment of the present disclosure. FIG. 2 shows a block diagram of the reconfigurable intelligent surface 100 according to the 1st embodiment in FIG. 1. As shown in FIGS. 1 and 2, the reconfigurable intelligent surface 100 includes a radiant layer 110, a sensing feeding circuit layer 120, a processing layer 140 and a controlling circuit layer 130. The radiant layer 110 includes at least two antennas 111 and a plurality of reflecting units 112. Each of the at least two antennas 111 is configured for sensing a polarization, a frequency or a direction angle of the incident electromagnetic wave I. The reflecting units 112 are arranged to form a reflecting surface 113. The sensing feeding circuit layer 120 is signally connected to the antennas 111 to produce a sensing signal. The processing layer 140 is signally connected to the sensing feeding circuit layer 120 and receives the sensing signal, and the processing layer 140 is configured for interpreting an electromagnetic wave polarization type and a tilt angle of the polarization of the incident electromagnetic wave I, a frequency value of the frequency of the incident electromagnetic wave I, and a direction angle value of the direction angle of the incident electromagnetic wave I to produce a controlling signal corresponding thereto. The controlling circuit layer 130 is signally connected to the radiant layer 110 and the processing layer 140, and the controlling circuit layer 130 receives the controlling signal and controls the reflecting units 112 to adjust and form the reflecting electromagnetic wave R according to the controlling signal.

Therefore, by positioning the antennas 111 for sensing the incident electromagnetic wave I on the reconfigurable intelligent surface 100, the polarization, the frequency, and the direction angle of the incident electromagnetic wave I can be detected precisely during the incidence of the incident electromagnetic wave I to the reconfigurable intelligent surface 100, and then the reconfigurable intelligent surface 100 can obtain the more complete information of the electromagnetic wave in the environment to decrease the testing times for the condition of the whole electromagnetic environment. In results, the reconfigurable intelligent surface 100 can adjust the electromagnetic environment directly according to the recent incident electromagnetic wave I, and the controlling circuit layer 130 can control the reflecting units 112 to adjust and form the adapted reflecting electromagnetic wave R according to the controlling signal of the processing layer 140 so as to transmit a communication signal to an electronic device precisely by the reflecting electromagnetic wave R. Hence, the accuracy of the signal transmitting and the overall adjusting efficiency of the reconfigurable intelligent surface 100 can be improved, and then difficulty of transmitting the communication signal from a base station to the electronic device can be reduced.

Each of the antennas 111 can be disposed on a surface of the reflecting surface 113. In detail, the reconfigurable intelligent surface 100 can be a plate-shaped structure, and the reflecting surface 113 formed by the reflecting units 112 is a surface of the plate-shaped structure. In specific, the surface of the reconfigurable intelligent surface 100 can be a plane surface, or a curved surface of a cylinder, the antennas 111 can be disposed upon or beneath the reflecting surface 113 formed by the reflecting units 112, but the present disclosure is not limited thereto. The antennas 111 can include a bipolarized antenna structure, a broadband antenna structure, or other antenna structures which can be configured for sensing the incident electromagnetic wave I, the antennas 111 can also include the combination of the aforementioned antenna structures at the same time, but the present disclosure is not limited thereto. When the antennas 111 include the bipolarized antenna structure, the electromagnetic wave polarization type of the polarization of the incident electromagnetic wave I can be sensed; when the antennas 111 include the broadband antenna structure, the frequency value of the frequency of the incident electromagnetic wave I can be sensed. In the 1st embodiment, a number of the antennas 111 corresponds to a number of the reflecting units 112, and each of the antennas 111 corresponds to each of the reflecting units 112 and is disposed beneath the reflecting surface 113. By positioning the antennas 111 upon or beneath the reflecting surface 113 formed by the reflecting units 112, the polarization, the frequency and the direction angle of the incident electromagnetic wave I can be detected precisely to improve the accuracy of sensing. In other embodiments, a number of the antennas is not necessary to correspond to a number of the reflecting units, the antennas and the reflecting units can be disposed at positions according to the real demands, but the present disclosure is not limited thereto. Hence, the cost of configuring antennas can be reduced.

Figure 3:
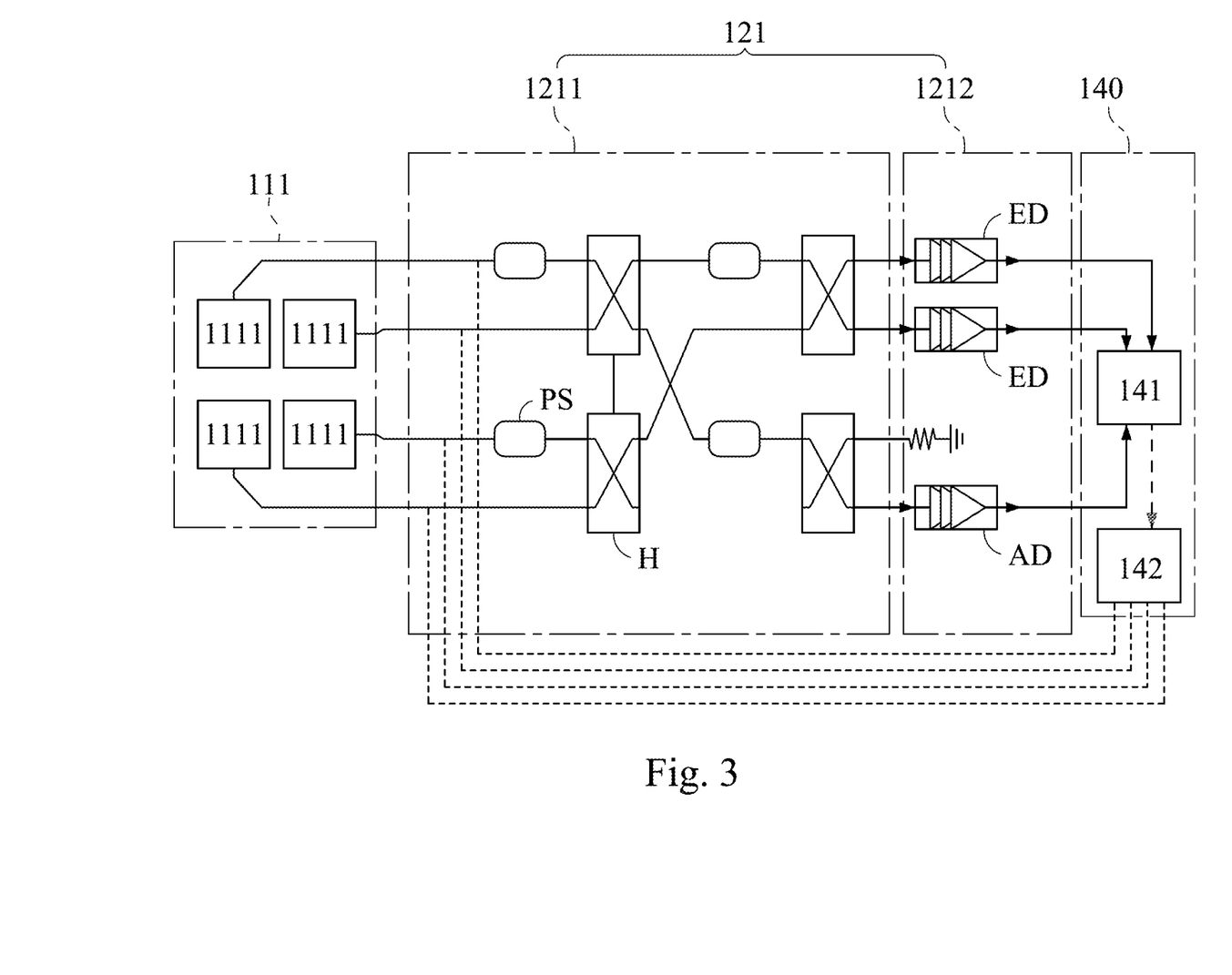
FIG. 3 shows a circuit diagram of the antennas, a direction angle sensing circuit of the sensing feeding circuit layer and the processing layer according to the 1st embodiment in FIG. 2.
Figure 4:
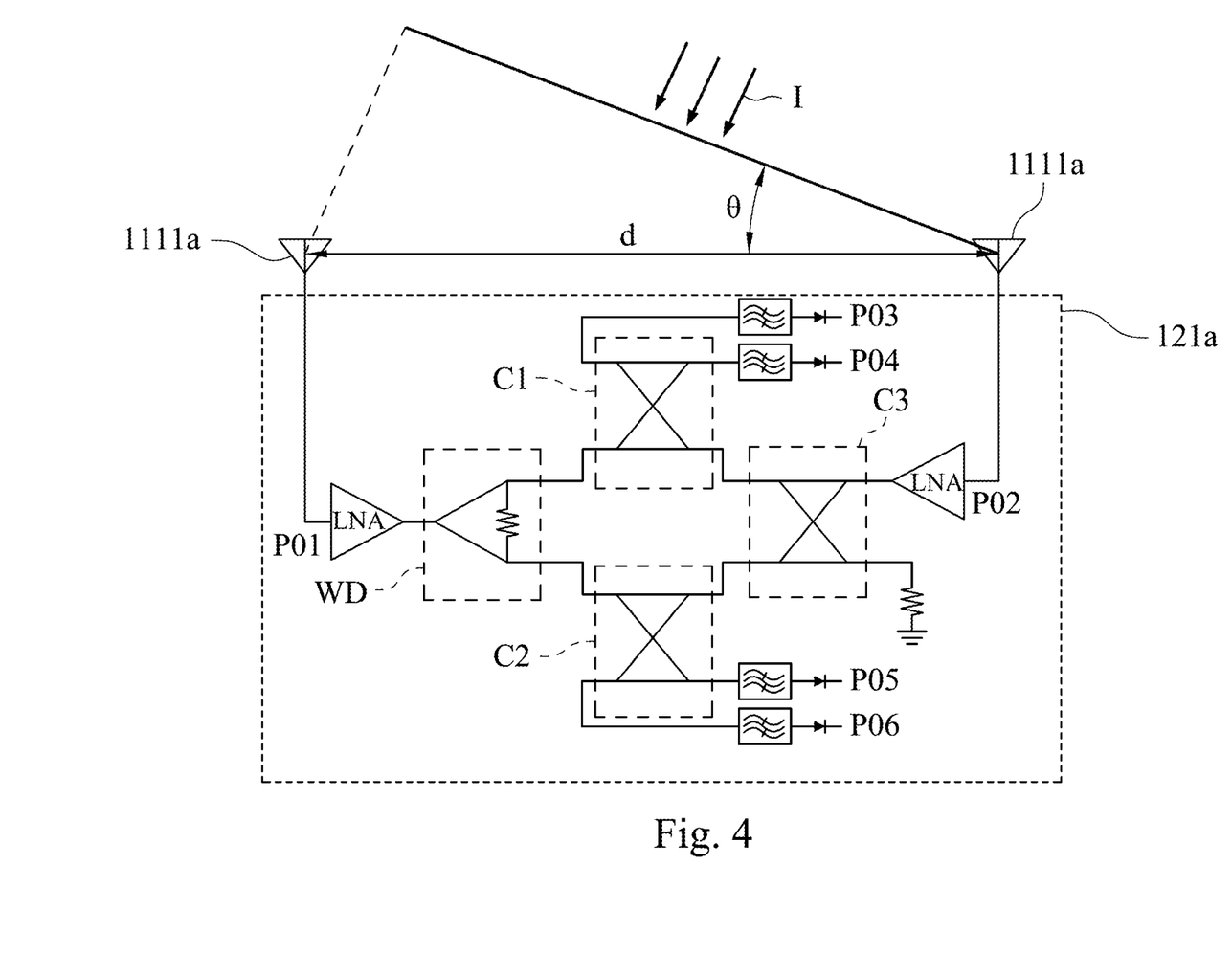
FIG. 4 shows a circuit diagram of antenna structures and a direction angle sensing circuit of the sensing feeding circuit layer sensing the incident electromagnetic wave according to the 1st embodiment in FIG. 2.
Figure 5:
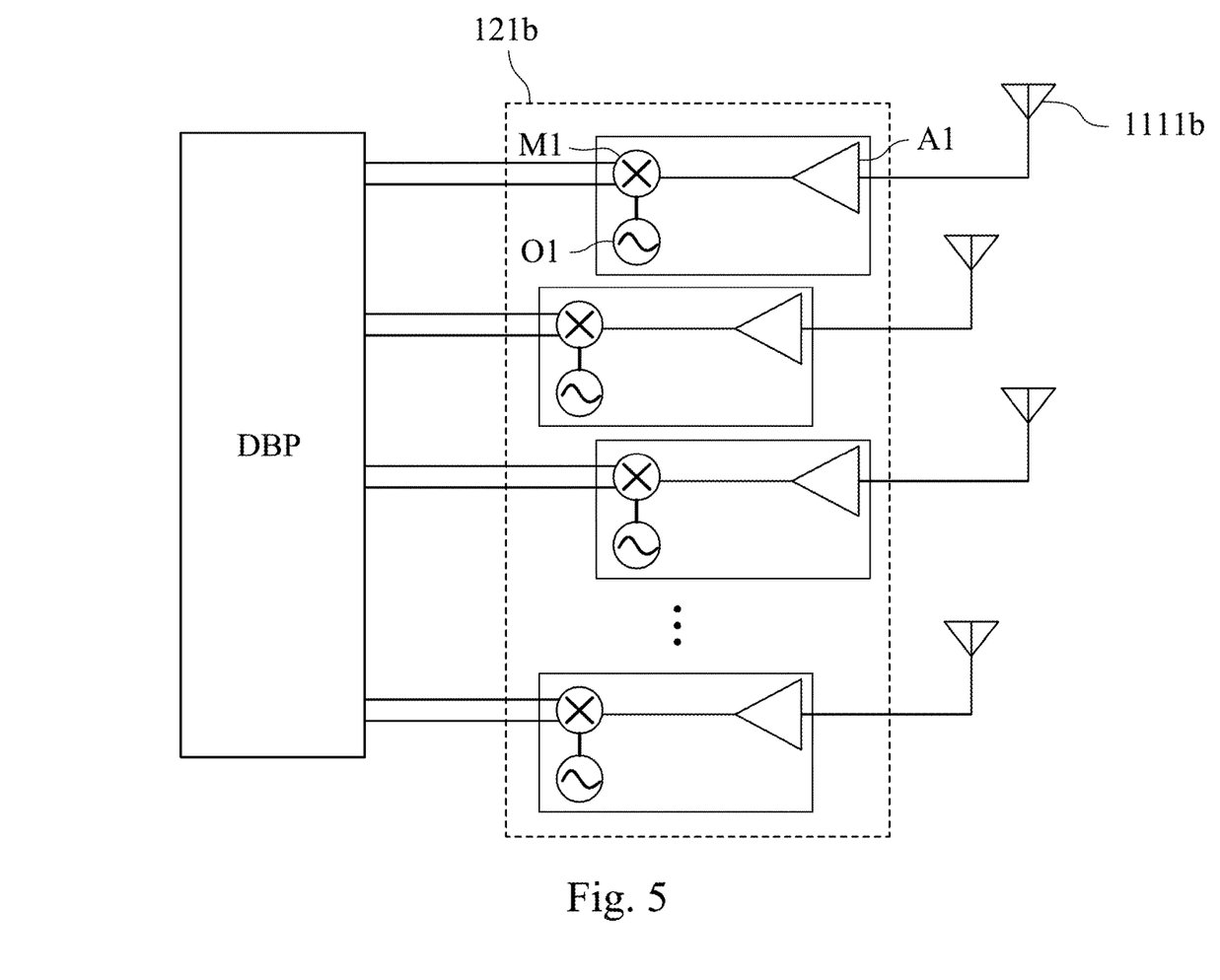
FIG. 5 shows a circuit diagram of antenna structures, direction angle sensing circuits of the sensing feeding circuit layer and a digital baseband processing unit according to the 1st embodiment in FIG. 2.
Figure 6:
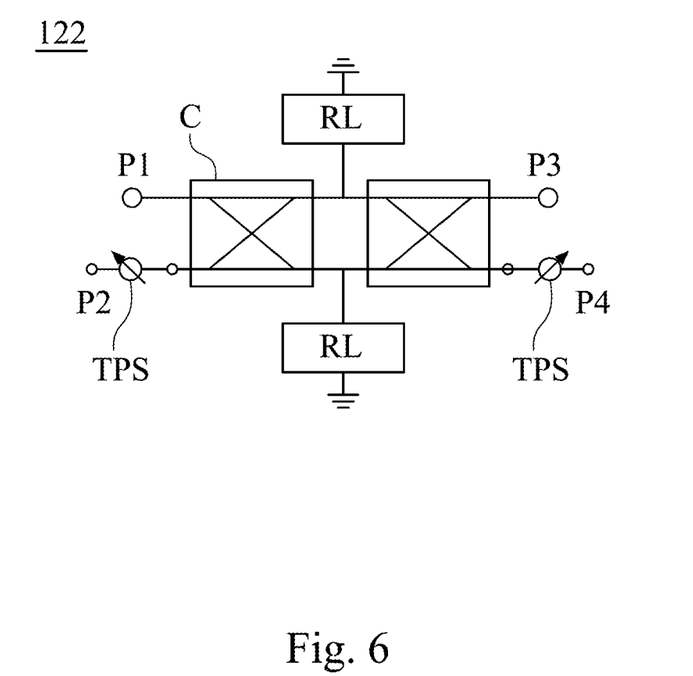
FIG. 6 shows a circuit diagram of a polarization sensing circuit of the sensing feeding circuit layer according to the 1st embodiment in FIG. 2.
Figure 7:
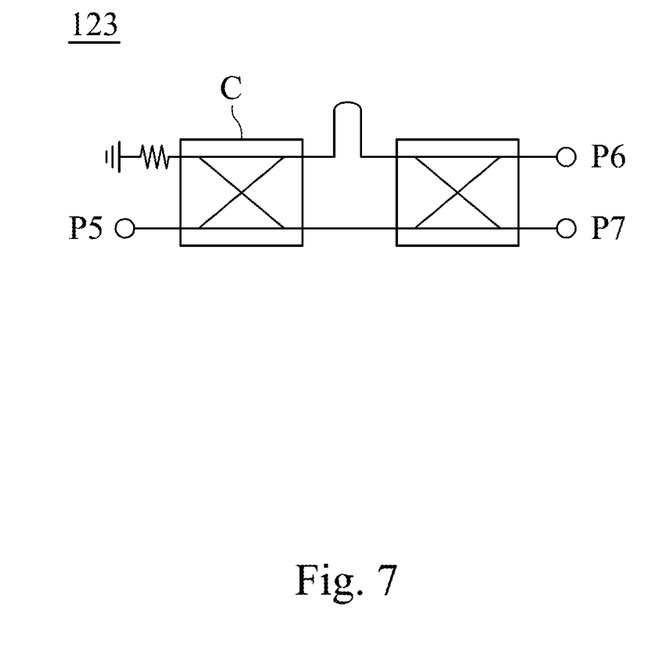
FIG. 7 shows a circuit diagram of a frequency sensing circuit of the sensing feeding circuit layer according to the 1st embodiment in FIG. 2.

FIG. 3 shows a circuit diagram of the antennas 111, a direction angle sensing circuit 121 of the sensing feeding circuit layer 120 and the processing layer 140 according to the 1st embodiment in FIG. 2. FIG. 4 shows a circuit diagram of antenna structures 1111a and a direction angle sensing circuit 121a of the sensing feeding circuit layer 120 sensing the incident electromagnetic wave I according to the 1st embodiment in FIG. 2. FIG. 5 shows a circuit diagram of antenna structures 1111b, direction angle sensing circuits 121b of the sensing feeding circuit layer 120 and a digital baseband processing unit DBP according to the 1st embodiment in FIG. 2. FIG. 6 shows a circuit diagram of a polarization sensing circuit 122 of the sensing feeding circuit layer 120 according to the 1st embodiment in FIG. 2. FIG. 7 shows a circuit diagram of a frequency sensing circuit 123 of the sensing feeding circuit layer 120 according to the 1st embodiment in FIG. 2. As shown in FIGS. 3 to 7, the sensing feeding circuit layer 120 can include three direction angle sensing circuits 121, 121a, 121b, a polarization sensing circuit 122 and a frequency sensing circuit 123. The direction angle sensing circuit 121 can include a tunable 2D comparator 1211 and a received signal strength indication (RSSI) module 1212. The processing layer 140 can include a processing unit 141 and a signal converting unit 142. The tunable 2D comparator 1211 is signally connected to the antennas 111, and determines if an electromagnetic wave signal is the incident electromagnetic wave I or not according to an environment electromagnetic threshold. When the electromagnetic wave signal is larger than the environment electromagnetic threshold, the tunable 2D comparator 1211 determines that the incident electromagnetic wave I is incident to the reflecting surface 113, and generates the sensing signal. The RSSI module 1212 is signally connected to the tunable 2D comparator 1211 and the processing unit 141 and configured for sensing a common-mode and a differential-mode signal of the electromagnetic wave. When the number of the antennas 111 is two, the two-dimensional direction angle of the incident electromagnetic wave I can be sensed. When the number of the antennas 111 is at least three, a signal of the incident electromagnetic wave I can be sensed by a direction angle sensing surface formed by the at least three antennas 111, and then the sensing signal of the direction angle can be formed and configured for the processing layer 140 to determine the angle value of the direction angle of the incident electromagnetic wave I after processed by the tunable 2D comparator 1211 and the RSSI module 1212. In specific, the tunable 2D comparator 1211 includes four 90-degree phase shifter PS and four 3 dB hybrid coupler H, and the tunable 2D comparator 1211 is connected to four antenna structures 1111 included by each of the antennas 111. The RSSI module 1212 includes two elevation difference amplifiers ED and an Azimuth difference amplifier AD, the specific structures of the tunable 2D comparator 1211 and the RSSI module 1212 are not the main features of the present disclosure but the conventional features, and the detail thereof is not described herein. The processing unit 141 can be a micro control unit (MCU), and signally connected to the RSSI module 1212 and the signal converting unit 142. The signal converting unit 142 is signally connected to the sensing feeding circuit layer 120, receives the sensing signal of the direction angle from the sensing feeding circuit layer 120, converts the sensing signal from the an analog form to a digital form, and then transmits the sensing signal to the processing unit 141.

As shown in FIG. 4, the direction angle sensing circuit 121a includes a Wilkinson power divider WD, three 3 dB branch-line couplers C1, C2, C3, two power amplifiers LNA and six ports P01, P02, P03, P04, P05, P06. Furthermore, the port P01 is electrically connected to an antenna structure 1111a included by one of the antennas 111 and one of the power amplifiers LNA, the port P02 is electrically connected to another antenna structure 1111a included by another of the antennas 111 and the other one of the power amplifiers LNA, and a distance between the two antenna structures 1111a is d, and an incident angle θ is contained between the aforementioned another antenna structure 1111a and a plane surface perpendicular to an incident direction of the incident electromagnetic wave I. The aforementioned one of the power amplifiers LNA is electrically connected to the Wilkinson power divider WD, the Wilkinson power divider WD is electrically connected to the two 3 dB branch-line couplers C1, C2, the two 3 dB branch-line couplers C1, C2 are electrically connected to the 3 dB branch-line coupler C3, and the 3 dB branch-line coupler C3 is electrically connected to the aforementioned the other one of the power amplifiers LNA. The 3 dB branch-line coupler C1 is electrically connected to the two ports P03, P04, and the 3 dB branch-line coupler C2 is electrically connected to the two ports P05, P06. By measuring the voltages $V_1$, $V_2$, $V_3$, $V_4$ on the ports P03, P04, P05, P06, respectively, the incident phase shift $\Delta\varphi$ can be calculated as the following formula (1):

$$\Delta\varphi = \tan^{-1}\left(\frac{V_1 - V_2}{V_3 - V_4}\right). \tag{1}$$

And, the incident angle θ can be calculated by the incident phase shift $\Delta\varphi$ and the distance d between the two antenna structures 1111a as the following formula (2), wherein A represents a wavelength of the incident electromagnetic wave I:

$$\theta = \sin^{-1}\left[\tan^{-1}\left(\frac{V_1 - V_2}{V_3 - V_4}\right)\frac{\lambda}{2\pi d}\right]. \tag{2}$$

By the design of the direction angle sensing circuit 121a, the direction angle of the incident electromagnetic wave I during incidence can be calculated by positioning the two antennas 111 at different positions.

As shown in FIG. 5, one of the antennas 111 includes a plurality of antenna structures 1111b, the direction angle sensing circuit 121b includes a plurality of array circuits, and the processing layer 140 can further include a digital baseband processing unit DBP. Each of the array circuits is electrically connected to each of the antenna structures 1111b, and the array circuits are electrically connected to the digital baseband processing unit DBP. As an example of one of the array circuits shown in FIG. 5, each of the array circuits includes a mixer M1, an oscillator O1 and an amplifier A1. By the theory of the phased array, the digital baseband processing unit DBP can receive signals of the antenna structures 1111b which sense the incident electromagnetic wave I from different directions, calculates the phase shift between each of the antenna structures 1111b, and then determines the direction angle of the incident electromagnetic wave I. Hence, incident directions of a plurality of electromagnetic waves can be scanned and determined quickly.

As shown in FIG. 6, the polarization sensing circuit 122 can include two reflecting loads RL, two 3 dB couplers C and four ports P1, P2, P3, P4. The two ports P1, P3 are connected to the processing layer 140 and configured for transmitting the sensing signal of the polarization of the incident electromagnetic wave I to the processing layer 140. Each of the two ports P2, P4 is connected to a 180-degree tunable phase shifter TPS, and the two ports P2, P4 are signally connected to two ends of one of the antennas 111 which is used as the bipolarized antenna to receive the signal of the incident electromagnetic wave I. Combining the two 3 dB couplers C to be a 0 dB coupler, the signal can be output from the port P4 to the port P1 completely. With the reflecting loads RL, the input power of the ports P2, P4 can be adjusted and output to the port P1 to adjust the power difference between the horizontal polarization and the vertical polarization of the electromagnetic wave received by the polarization sensing circuit 122. And, the input phase difference between the ports P2, P4 can be adjusted by the 180-degree tunable phase shifter TPS. Hence, the electromagnetic wave polarization type of the polarization of the incident electromagnetic wave I such as a linear polarization, a circular polarization, or an elliptical polarization, and the tilt angle of the polarization of the incident electromagnetic wave I can be sensed.

As show in FIG. 7, the frequency sensing circuit 123 includes three ports P5, P6, P7 and two 3 dB couplers C. The two ports P5, P7 are connected to two ends of one of the antennas 111 which is used as the broadband antenna structure. The port P6 is connected to the processing layer 140. By measuring the power ratio between the ports P6, P7, the frequency value of the frequency of the incident electromagnetic wave I can be obtained, and the frequency sensing circuit 123 can transmit the sensing signal of the frequency value of the frequency of the incident electromagnetic wave I to the processing layer 140. Hence, the frequency value of the frequency of the incident electromagnetic wave I can be sensed.

It is worthy to be mentioned that the direction angle sensing circuits 121, 121a, 121b, the polarization sensing circuit 122 and the frequency sensing circuit 123 of the sensing feeding circuit layer 120 can be any circuit which is configured for sensing the electromagnetic wave polarization type and the tilt angle of the polarization, the frequency value of the frequency, and the direction angle value of the direction angle of the incident electromagnetic wave I, but the present disclosure is not limited to the aforementioned circuits.

Figure 8:
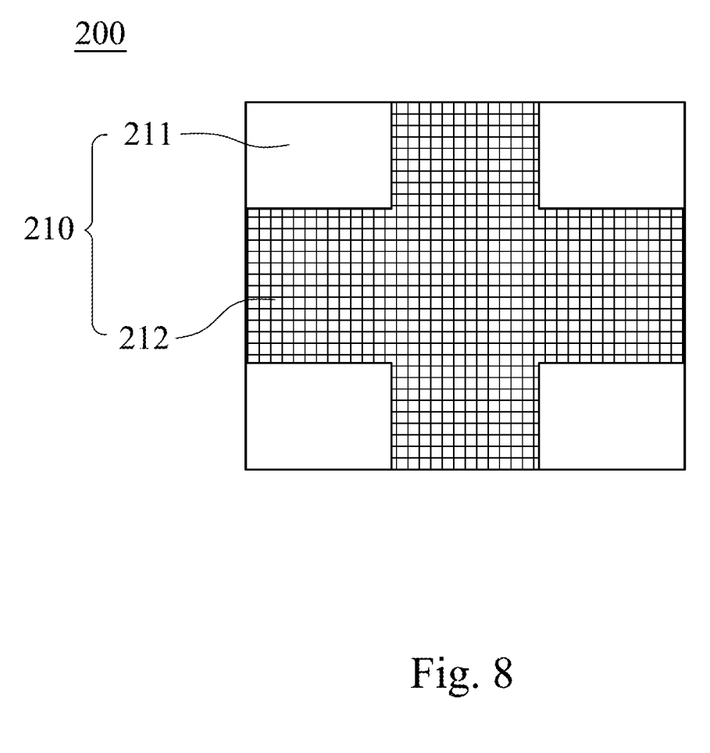
FIG. 8 shows a top view of a reconfigurable intelligent surface according to the 2nd embodiment of the present disclosure.

FIG. 8 shows a top view of a reconfigurable intelligent surface 200 according to the 2nd embodiment of the present disclosure. In the 2nd embodiment, the structure and the configuration of the reconfigurable intelligent surface 200 is similar with the structure and the configuration of the reconfigurable intelligent surface 100 of the 1st embodiment, and the detail is not described herein. In particular, in a radiant layer 210 of the reconfigurable intelligent surface 200, at least three antennas 211 and a reflecting surface formed by reflecting units 212 are coplanar. As shown in FIG. 8, the reconfigurable intelligent surface 200 can include four surface notches, a number of the antennas 211 is four, and the four antennas 211 are disposed at the four surface notches, respectively, to be coplanar with the reflecting surface so that the reflecting surface of the reflecting units 212 can be formed a cross-shaped surface. Furthermore, for the surface formed by the reflecting surface of the reflecting units 212 and the antennas 211, even surface area of the antennas 211 makes up a most proportion of the total surface area, the reflecting units 212 can still reflect an incident electromagnetic wave to form an adapted reflecting electromagnetic wave, but the present disclosure is not limited thereto. Hence, the sensing accuracy can be improved without affecting the strength of the reflecting electromagnetic wave adjusted and formed by the reflecting units 212.

Figure 9:
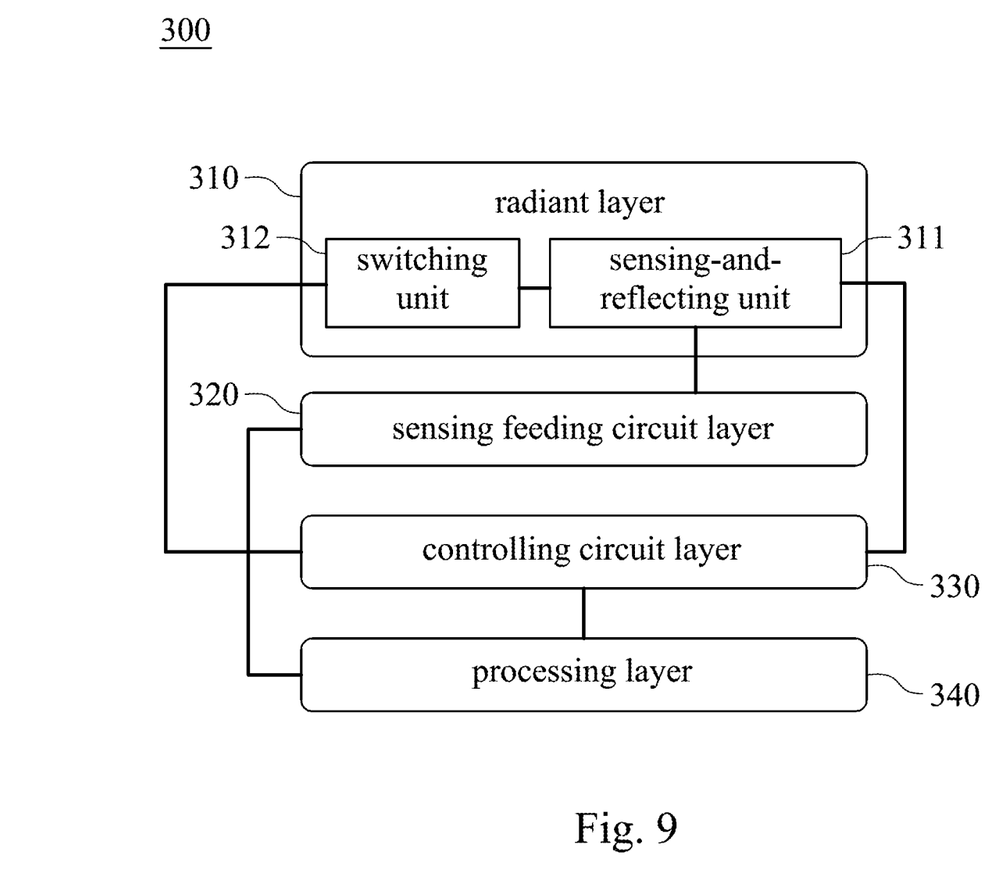
FIG. 9 shows a block diagram of a reconfigurable intelligent surface according to the 3rd embodiment of the present disclosure.

FIG. 9 shows a block diagram of a reconfigurable intelligent surface 300 according to the 3rd embodiment of the present disclosure. As shown in FIG. 9, in the 3rd embodiment, a sensing feeding circuit layer 320, a controlling circuit layer 330 and a processing layer 340 of the reconfigurable intelligent surface 300 can be the same as the sensing feeding circuit layer 120, the controlling circuit layer 130 and a processing layer 140 of the reconfigurable intelligent surface 100 of the 1st embodiment, and the detail thereof will not be described herein. In particular, the reconfigurable intelligent surface 300 can further include a plurality of switching units 312, and a radiant layer 310 of the reconfigurable intelligent surface 300 includes a plurality of sensing-and-reflecting units 311. The sensing-and-reflecting units 311 are arranged to form a reflecting surface. The switching units 312 are configured to switch each of the sensing-and-reflecting units 311 to a sensing mode or a reflecting mode. When each of the sensing-and-reflecting units 311 is operated in the sensing mode, each of the sensing-and-reflecting units 311 is configured for sensing an incident electromagnetic wave; when each of the sensing-and-reflecting units 311 is operated in the reflecting mode, each of the sensing-and-reflecting units is configured to adjust and form a reflecting electromagnetic wave according to an electromagnetic wave polarization type and a tilt angle of a polarization of the incident electromagnetic wave, a frequency value of a frequency of the incident electromagnetic wave, and a direction angle value of a direction angle of the incident electromagnetic wave. Moreover, the sensing feeding circuit layer 320 is signally connected to the sensing-and-reflecting units 311, and when each of the sensing-and-reflecting units 311 is operated in the sensing mode, the sensing feeding circuit layer 320 produces a sensing signal. The controlling circuit layer 330 controls the switching units 312 according to the controlling signal produced by the processing layer 340 to switch each of the sensing-and-reflecting units 311 to operate in the sensing mode or operate in the reflecting mode, and when each of the sensing-and-reflecting units 311 is at the reflecting mode, the sensing-and-reflecting units 311 adjust and form a reflecting electromagnetic wave. In specific, the mode of each of the sensing-and-reflecting units 311 on the reflecting surface can be switched according to a distance between the reconfigurable intelligent surface 300 and a base station or an electronic device, or electromagnetic waves in environment so as to improve the convenience of the reconfigurable intelligent surface 300.

As shown in FIG. 9, the switching units 312 are disposed in the radiant layer 310. In other embodiments, the switching units can be disposed in the sensing feeding circuit layer, but the present disclosure is not limited thereto. In specific, each of the switching units 312 can be a m-pole n-throw circuit, m is more than or equal to one, and n is more than or equal to two, the m-pole n-throw circuit can be for example a single-pole double-throw (1P2T) circuit, a double-pole double-throw (2P2T) circuit, or a single-pole quadruple-throw (1P4T) circuit so as to switch each of the sensing-and-reflecting units 311 to operate in the sensing mode or operate in the reflecting mode.

Figure 10:
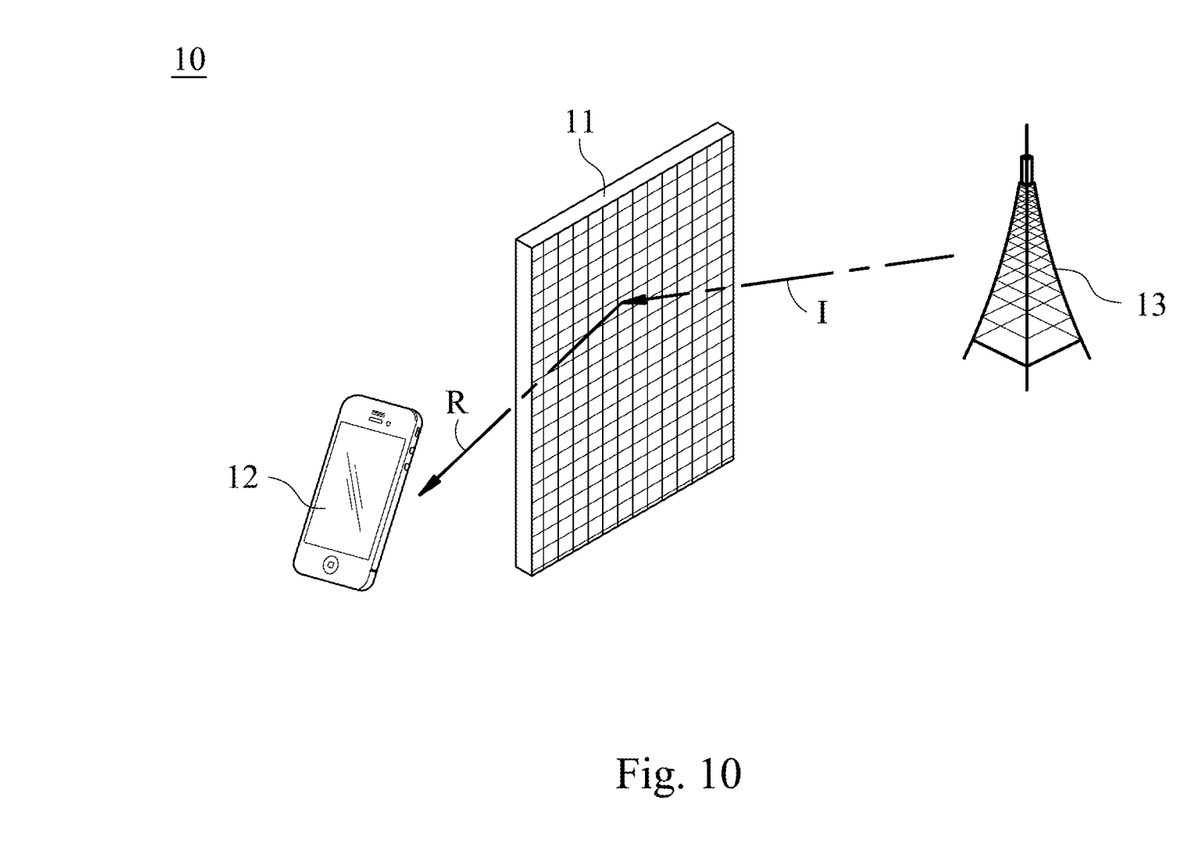
FIG. 10 shows a schematic view of an electromagnetic sensing system based on a reconfigurable intelligent surface according to the 4th embodiment of the present disclosure.

FIG. 10 shows a schematic view of an electromagnetic sensing system 10 based on a reconfigurable intelligent surface 11 according to the 4th embodiment of the present disclosure. As shown in FIG. 10, the electromagnetic sensing system 10 based on the reconfigurable intelligent surface 11 includes a base station 13, the reconfigurable intelligent surface 11 and an electronic device 12. The base station 13 is configured for emitting an incident electromagnetic wave I. The reconfigurable intelligent surface 11 is configured for sensing the incident electromagnetic wave I to adjust and form a reflecting electromagnetic wave R. The electronic device 12 is configured to receive the reflecting electromagnetic wave R. The structure of the reconfigurable intelligent surface 11 can be any of the reconfigurable intelligent surfaces 100, 200, 300 described in the aforementioned 1st to 3rd embodiments, but the present disclosure is not limited thereto. Hence, by the reconfigurable intelligent surface 11 sensing a signal of the incident electromagnetic wave I emitted from the base station 13 precisely, the reflecting electromagnetic wave R can be adjusted, formed and transmitted to the electronic device 12 to boost the speed of adjusting and forming the reflecting electromagnetic wave R and to improve the stability of the electronic device 12 as receiving the signal. Thus, a user can use the electronic device 12 without signal loss, and the using experience of the user can be improved.

As shown in the aforementioned embodiments, the present disclosure provides a reconfigurable intelligent surface and an electromagnetic sensing system based on the reconfigurable intelligent surface which have the following advantages. First, by disposing of antennas sensing an incident electromagnetic wave at the radiant layer, the accuracy of transmitting the communication signal can be improved. Second, via the antennas coplanar with the reflecting surface, the accuracy of sensing can be improved. Third, by integrating the antennas and the reflecting units into the sensing-and-reflecting units, the sensing-and-reflecting units can be switched to operate in different modes according to the environment to improve using convenience.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A reconfigurable intelligent surface, comprising:
   a radiant layer, comprising:
     at least two antennas, wherein each of the at least two antennas is configured for sensing a polarization, a frequency or a direction angle of an incident electromagnetic wave; and
     a plurality of reflecting units arranged to form a reflecting surface;
   a sensing feeding circuit layer signally connected to the at least two antennas to produce a sensing signal;
   a processing layer signally connected to the sensing feeding circuit layer and receiving the sensing signal, the processing layer configured to interpret an electromagnetic wave polarization type and a tilt angle of the polarization of the incident electromagnetic wave, a frequency value of the frequency of the incident electromagnetic wave, and a direction angle value of the direction angle of the incident electromagnetic wave to produce a controlling signal corresponding thereto; and
   a controlling circuit layer signally connected to the radiant layer and the processing layer, wherein the controlling circuit layer receives the controlling signal and controls the reflecting units according to the controlling signal to adjust and form a reflecting electromagnetic wave.

2. The reconfigurable intelligent surface of claim 1, wherein each of the at least two antennas is disposed on the reflecting surface.

3. The reconfigurable intelligent surface of claim 1, wherein the at least two antennas and the reflecting surface are coplanar.

4. The reconfigurable intelligent surface of claim 1, wherein the processing layer comprises a signal converting unit signally connected to the sensing feeding circuit layer, and the signal converting unit receives the sensing signal from the sensing feeding circuit layer and converts the sensing signal from an analog form to a digital form.

5. A reconfigurable intelligent surface, comprising:
   a radiant layer, comprising:
     a plurality of sensing-and-reflecting units arranged to form a reflecting surface;
     a plurality of switching units configured to switch each of the sensing-and-reflecting units to a sensing mode or a reflecting mode, wherein when each of the sensing-and-reflecting units is operated in the sensing mode, each of the sensing-and-reflecting units is configured for sensing an incident electromagnetic wave; when each of the sensing-and-reflecting units is operated in the reflecting mode, each of the sensing-and-reflecting units is configured to adjust and form a reflecting electromagnetic wave according to an electromagnetic wave polarization type and a tilt angle of a polarization of the incident electromagnetic wave, a frequency value of a frequency of the incident electromagnetic wave, and a direction angle value of a direction angle of the incident electromagnetic wave;
   a sensing feeding circuit layer signally connected to the sensing-and-reflecting units, wherein when each of the sensing-and-reflecting units is operated in the sensing mode, the sensing feeding circuit layer produces a sensing signal;
   a processing layer signally connected to the sensing feeding circuit layer and receiving the sensing signal, the processing layer configured for interpreting the electromagnetic wave polarization type and the tilt angle of the polarization of the incident electromagnetic wave, the frequency value of the frequency of the incident electromagnetic wave, and the direction angle value of the direction angle of the incident electromagnetic wave to produce a controlling signal corresponding thereto; and a controlling circuit layer signally connected to the radiant layer and the processing layer, wherein the controlling circuit layer receives the controlling signal and controls the switching units according to the controlling signal to switch each of the sensing-and-reflecting units to operate in the sensing mode or operate in the reflecting mode, when each of the sensing-and-reflecting units is at the reflecting mode, the sensing-and-reflecting units adjust and form the reflecting electromagnetic wave.

6. The reconfigurable intelligent surface of claim 5, wherein each of the switching units is a m-pole n-throw circuit, m is more than or equal to one, and n is more than or equal to two.

7. An electromagnetic sensing system based on a reconfigurable intelligent surface, comprising:
  a base station configured for emitting an incident electromagnetic wave;
  the reconfigurable intelligent surface configured for sensing the incident electromagnetic wave to adjust and form a reflecting electromagnetic wave, comprising:
    a radiant layer, comprising:
      at least two antennas, wherein each of the at least two antennas is configured for sensing a polarization, a frequency or a direction angle of the incident electromagnetic wave; and
      a plurality of reflecting units arranged to form a reflecting surface;
    a sensing feeding circuit layer signally connected to the at least two antennas to produce a sensing signal;
    a processing layer signally connected to the sensing feeding circuit layer and receiving the sensing signal, and the processing layer configured for interpreting an electromagnetic wave polarization type and a tilt angle of the polarization of the incident electromagnetic wave, a frequency value of the frequency of the incident electromagnetic wave, and a direction angle value of the direction angle of the incident electromagnetic wave to produce a controlling signal corresponding thereto; and
    a controlling circuit layer signally connected to the radiant layer and the processing layer, wherein the controlling circuit layer receives the controlling signal and controls the reflecting units according to the controlling signal to adjust and form the reflecting electromagnetic wave; and
  an electronic device configured to receive the reflecting electromagnetic wave.

8. The electromagnetic sensing system based on the reconfigurable intelligent surface of claim 7, wherein each of the at least two antennas is disposed on the reflecting surface.

9. The electromagnetic sensing system based on the reconfigurable intelligent surface of claim 7, wherein the at least two antennas and the reflecting surface are coplanar.

10. The electromagnetic sensing system based on the reconfigurable intelligent surface of claim 7, wherein the processing layer comprises a signal converting unit signally connected to the sensing feeding circuit layer, and the signal converting unit receives the sensing signal from the sensing feeding circuit layer and converts the sensing signal from an analog form to a digital form.

* * * * *